Figure 1:
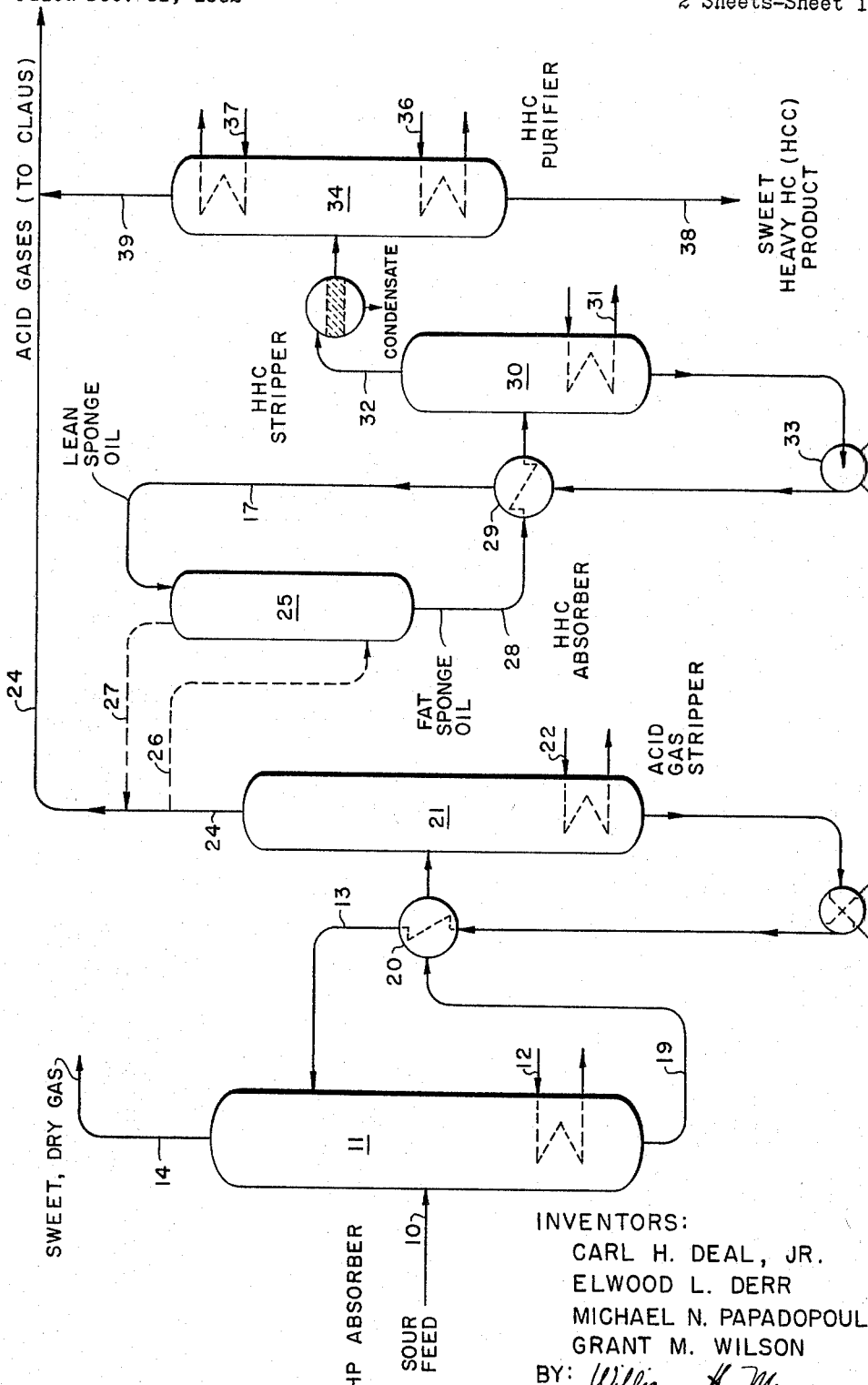
Figure 2:
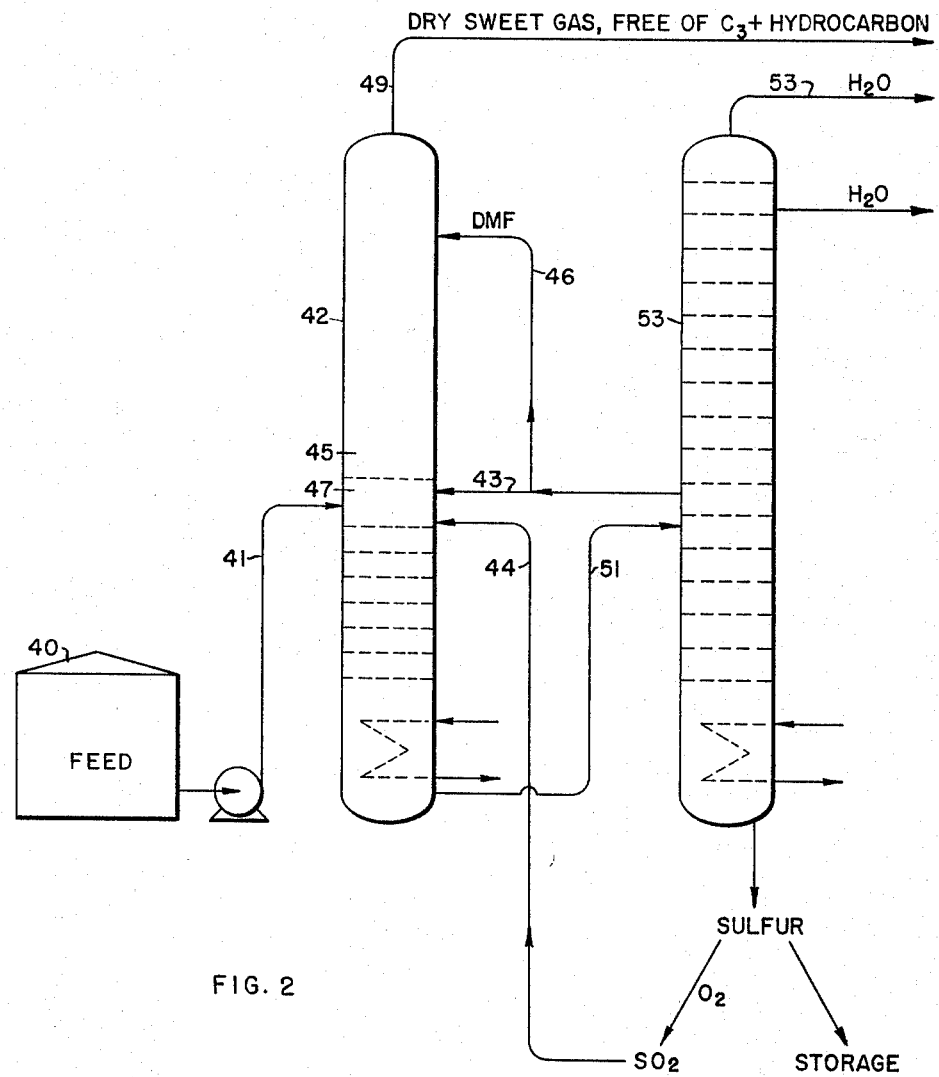

INVENTORS:
CARL H. DEAL, JR.
ELWOOD L. DERR
MICHAEL N. PAPADOPOULOS
GRANT M. WILSON
BY: William H. Myers
THEIR AGENT INVENTORS:
CARL H. DEAL, JR.
ELWOOD L. DERR
MICHAEL N. PAPADOPOULOS
GRANT M. WILSON
BY: *William H. Myers*
THEIR AGENT

United States Patent Office 3,284,162
Patented Nov. 8, 1966

3,284,162
SEPARATION PROCESS
Carl H. Deal, Jr., Amsterdam, Netherlands, Elwood L. Derr and Michael N. Papadopoulos, Walnut Creek, Calif., and Grant M. Wilson, Emmaus, Pa., assignors to Shell Oil Company, New York, N.Y., a corporation of Delaware
Filed Dec. 31, 1962, Ser. No. 261,244
(Filed under Rule 47(b) and 35 U.S.C. 118)
7 Claims. (Cl. 23—226)

This case is a continuation-in-part of applicants' copending case Serial No. 82,924 filed January 16, 1961, now abandoned.

This invention relates to the separation of acidic gases from gaseous mixtures. Mores particularly, this invention relates to the separation of sulfur-containing acidic gases from gas mixtures by means of selective absorbent.

A number of methods have previously been proposed for the removal of acid gases from mixtures of gases contaminated with such materials as hydrogen sulfide, carbonyl sulfide, carbon dioxide and the like. Some of these methods usually involve the formation of salts of the acid gases, and salts being subsequently decomposed usually by heating to regenerate the solution utilized as an absorbent and to drive off the gas absorbed.

In many instances aqueous solutions of alkanolamines and the like are utilized, resulting in the necessity for recycling and treating unduly large quantities of such solutions and also resulting in undue corrosion of processing equipment due particularly to the presence of sulfur-containing compounds and water. These disadvantages require excessive capital expenditures in order to treat a given quantity of gas. Another disadvantage of these selective absorption processes comprises the necessity for a separate dehydration step, since such absorbents as aqueous alkanolamine or gycol solutions do not selectively remove water at the same time that they absorb acidic gases such as hydrogen sulfide. Another disadvantage of many selective absorption processes comprises a necessity for separate treating steps and additional cumbersome equipment for the removal of gasoline hydrocarbon components which may be present as a contaminant or additional part of gases such as natural gas and the like.

Another problem encountered in the treating of hydrocarbon gases for the removal of acidic gas components such as hydrogen sulfide, is the tendency for unduly large proportions of hydrocarbons to be absorbed in the absorbing liquid along with the acidic gas. Thus two adverse phenomena occur. First, the acid gas is contaminated with hydrocarbons which may be a disadvantage in later utilization steps carried out with or upon the acid gases. Secondly, this also results in a concomitant loss of hydrocarbons from the sweet hydrocarbon gas stream. Such losses as this occur when ordinary absorption columns are used within the temperature within the column is essentially uniform throughout that column.

It is an object of the present invention to overcome disadvantages inherent in chemical reaction processes previously utilized for removal of acidic gases from mixtures containing them. It is a further object of the present invention to provide a new and improved process involving use of an absorbent under particular conditions permitting much greater physical separation of the acid gases from the hydrocarbon component of the gas mixture being treated. It is a particular object of the invention to provide a new and improved process for the production of elementary sulfur and, at the same time to produce a sweet hydrocarbon gas stream. Other objects and advantages of the present invention will become apparent from the following specification.

FIGURE I shows an arrangement of apparatus suitable for carrying out the basic invention. FIGURE II comprises an arrangement of apparatus useful for carrying out the variation in the process of the invention wherein elemental sulfur is directly prepared in the absorber tower.

Now, in accordance with the present invention, separation and recovery of sulfur-containing acidic gases from mixtures containing the same are accomplished by contacting the gas mixture with a dialykl N-substituted aliphatic acid amide in a rectified absorber zone wherein the temperature differential between the bottom of the zone and the top of the absorption section of the zone is between about 50° F. and about 150° F. More particularly in accordance with this invention, gaseous mixtures containing at least about 0.1 mol percent of hydrogen sulfide may be contacted with the amide especially under pressures in excess of about 10 p.s.i.a. at ambient temperatures in a rectified absorber zone wherein the top to bottom temperature differential is preferably between about 50° F. and about 150° F. so as to absorb only a minor amount of hydrocarbons and essentially all of the hydrogen sulfide in the amide, the principal amount of the hydrocarbons being rejected by the amide and separated therefrom.

In accordance with a particularly preferred version of the invention, the acid gases, contmainated with gasoline hydrocarbons are passed through a sponge oil comprising gas oil hydrocarbons wherein the gasoline components are absorbed in the sponge oil, the acid gases passing to a utilization destination.

In still another aspect of the present invention, sulfur dioxide is injected into the absorption column for the purpose of reaction with absorbed hydrogen sulfide to form elemental sulfur, the remaining aspects of the invention as recited above being essentially the same. This aspect of the invention is based upon the unexpected finding that dialkyl N-substituted aliphatic acid amides constitute a surprisingly amenable medium in which to form elemental sulfur by such a reaction. In this medium the sulfur forms a relatively heavy precipitate which rapidly settles from the main bulk of the amide and is easily separated therefrom, such as by decantation or centrifuging. Contrasted to this, formation of elemental sulfur in many other media, such as glycols, results in the preparation of an extremely finely divided milky precipitate which tends to cling to the walls and component parts of treating equipment.

In addition, the rates of formation of sulfur in such a medium are unexpectedly great, many times greater than in other media, as shown in the tabulation of experimental results below:

| Solvent | Rate Constant of Sulfu Formation, 50° C. $K = R/[(H_2S)^2(SO_2)]$ |
|---|---|
| Water | 7 |
| Diethylene glycol—10% water | 15 |
| Dimethyl formamide | 7,000 |

Presumably at least in part these higher rates are due to the unexpected very high thermodynamic affinity of this medium for the reactants $H_2S$ and $SO_2$. The differences in such affinities between this and other media are shown in the tabulation below where affinities are expressed in terms of l./g., i.e., the reciprocal of the thermodynamic activity coefficient of reactant in medium. Such affinities in fact strongly suggest complex solution of reactants by dimethylformamide.

| Solvent | Affinity of Reactant for Solvent, l./g. | |
|---|---|---|
| | $SO_2$ | $H_2S$ |
| Water | 0.067 | 0.028 |
| DEG | 0.22 | 0.28 |
| Dimethyl Formamide | 100 | 2 |

Specific amides which may be utilized in the process of this invention are the dialkyl N-substituted aliphatic acid amides. The preferred species is dimethyl formamide, other species being those in which the alkyl groups directly attached to nitrogen have from 1 to 4 carbon atoms each and the acid being one having from 1 to 4 carbon atoms per molecule. These include dimethyl formamide, methylethyl formamide, diethyl formamide, propylmethyl formamide and dibutyl formamide. Other species include dimethylacetamide, methylethyl acetamide and dimethyl propamide. Mixtures of the amides may be utilized if desired.

The gas mixtures to be treated in accordance with this invention may include flue gas, refinery gases or natural gases, particularly those having a relatively high sulfur-containing acid gas content including at least about 0.1 mol percent hydrogen sulfide and as high as about 90 mol percent hydrogen sulfide. Other acid gases which may be present include sulfur dioxide, carbonyl sulfide or carbon dioxide. A typical natural gas of high acid gas content for which the present invention is especially useful has the following composition:

| Component: | Volume percent |
|---|---|
| Hydrogen sulfide | 31.48 |
| Carbon dioxide | 7.10 |
| Nitrogen | 4.52 |
| Methane | 50.35 |
| Ethane | 2.16 |
| Propane | 0.74 |
| Isobutane | 0.23 |
| Normal butane | 0.41 |
| Isopentane | 0.31 |
| Normal pentane | 0.39 |
| Hexanes | 0.53 |
| Heptanes and higher | 1.78 |

The basic step in the process of the invention comprises intimate contacting between the gaseous mixture and liquid amide under a pressure in excess of 10 pounds per square inch absolute and up to pressures as high as about 2,000 pounds per square inch absolute. The temperature at which intimate contacting is effected is immaterial as long as a gas and liquid phase is each maintained, but it is preferred to maintain ambient temperatures such as between about 50° F. and 150° F., preferably 80° F.–120° F. Countercurrent contacting is preferred in the absorption column, although this engineering detail may be varied according to specific plant design. An essential aspect of the operation of the absorption column is to conduct absorption under rectified absorber conditions wherein the bottom of the absorption tower has a temperature between about 50° F. and 150° F. higher than the temperature in the top part of the absorption zone. Normally, intimate contacting is effected in a vertically positioned tower, the sweet dry gas exiting from the tower near or at the top thereof while the fat amide solution leaves at or near the bottom of the tower. Heat may be supplied if necessary by means such as a steam coil or reboiler near the bottom of the tower. The tower is preferably supplied with fractionation plates, such as bubble cap plates or "flexi trays," i.e., valve trays.

The fat amide contains dissolved therein acid gases such as hydrogen sulfide together with possible contaminating proportions of hydrocarbons originally present in the gas mixture. Under the rectified absorption conditions, as specified above, the proportion of hydrocarbon contaminant to hydrogen sulfide is maintained at a minimum level, the maximum ratio of hydrocarbon to hydrogen sulfide being about 5:100 parts by weight. In the absence of rectification, the proportion of hydrocarbon contaminant which may occur in the fat amide is drastically greater, the proportion of hydrogen sulfide often far exceeding the amount of hydrogen sulfide persent. This is of particular disadvantage when the hydrogen sulfide is to be utilized subsequently for the preparation of elemental sulfur or for other known utilization purposes.

The fat amide solution of hydrogen sulfide is conducted from the bottom portion of the absorption tower, leaving under high pipeline pressure to a flashing zone wherein pressure is reduced 2–100 p.s.i.a for the purpose of removing a major portion of hydrogen sulfide. In the same or a subsequent tower, referred to as a gas stripper, the remaining fat amide solution is heated to a temperature sufficient to volatilize acid gases such as hydrogen sulfide and water therefrom which exit at various ports near the top of the stripping tower. Stripping may be assisted if desired by injection of a relatievly low boiling inert liquid such as a hydrocarbon having from 4 to 12 carbon atoms per molecule.

In accordance with one feature of the present invention any remaining gasoline type hydrocarbons (herein after referred to as "heavy hydrocarbons") may be removed by contacting the acid gases with a sponge oil comprising gas oil hydrocarbons. These latter normally have from 12 to 18 carbon atoms per molecule. Under such conditions the gasoline hydrocarbons are stripped from the evolved gases and the dry acid gases then exit for storage or further use. The acid gases then may be channeled to any desirable use such as in a sulfur producing plant (e.g. a Claus sulfur plant) wherein essentially a sufficient amount of pure hydrogen sulfide is oxidized to sulfur dioxide in proportions necessary to react with hydrogen sulfide and produce elementary sulfur and water. Such combinations may be effected in the presence of catalysts according to known procedures.

Contacting of the evolved gases with the sponge oil may be effected in a top section of the stripping tower or in a separate scrubber tower preferably at a temperature of 80° F.–150° F.

The fat sponge oil, containing gasoline hydrocarbons extracted from the acid gas phase is warmed, such as by indirect heat exchange with lean sponge oil being recycled to the spring oil scrubbing tower. In the sponge oil stripping section, the fat sponge oil may be heated still further, such as by means of a steam coil at the bottom of the stripper, to a temperature in the order of 300° F.–400° F. for the purpose of evolving gasoline hydrocarbons.

The reboiler at the bottom of the absorber tower may be replaced with an external fat solvent flasher, the flashed fractions being recycled to the absorber feed stream or bottom of the absorber column. Lower absorber temperatures may then be employed, resulting in an increase capacity of the amide to absorb acid gases. The pressure is such that at this bottom tower temperature the gasoline hydrocarbons are readily volatilized, pressures of about 25 p.s.i.a or less being preferred. The volatilized gasoline hydrocarbons may be utilized as such or further purified if necessary by passing to a gasoline hydrocarbon purifier tower wherein they are volatilized and passed through a cooling zone where the gasoline hydrocarbons condense and exist from the bottom of the purifier while any residual acid gases pass to the acid gas collection line.

Referring now to FIGURE I, in a specific case of treatment, a sour natural gas feed having the following composition was utilized for treatment according to the process of the invention.

| Component: | Mol percent |
| --- | --- |
| Methane | 52.21 |
| $H_2S$ | 34.98 |
| $CO_2$ | 10.11 |
| $N_2$ | 1.31 |
| Higher hydrocarbons | 1.35 |

The sour feed from a source 10 is injected into the lower section of a high pressure rectified absorber 11, fitted with a reboiler 12 and fractionation plates, not shown, under a pressure of about 1,000 p.s.i.a., the temperature of the feed being about 90° F. The bottom of the absorption tower is at a temperature of about 230° F. (maintained by the reboiler 12), while the top section of the absorber is at 80° F. The lean dimethylformamide enters the absorber 11 by means of line 13 at a temperature of about 80° F. Hydrogen sulfide, any water and a small amount of hydrocarbon are absorbed by the amide from the sour feed. Dry sweet hydrocarbon gas leaves the tower by means of line 14.

The fat dimethylformamide, containing hydrogen sulfide, other acid gases and about 0.1 part by weight of hydrocarbon per 10 parts by weight of $H_2S$, passes by means of line 19 through a heat exchanger 20 to the mid section of acid gas stripper 21. Herein the pressure is reduced to about 25 p.s.i.a. while its temperature is raised by means of reboiler 22 to about 320° F. at the bottom of the stripping column, the acid gas leaving the top of the column at about 220° F. by means of line 24. The gases may pass into the gasoline hydrocarbon absorber 25 wherein they are contacted with gas oil which acts as a sponge oil to extract gasoline hydrocarbons.

The wet gas enters the bottom of the absorber column by means of line 26 at a temperature of about 350° F., the scrubbed acid gases leaving the top of the column by means of line 27 at a temperature of about 245° F. and at about 25 p.s.i.a. They may be cooled by means of heat exchangers, not shown, to lower temperatures such as about 70° F. In the gasoline hydrocarbon absorber column 25, the acid gases are scrubbed with the lean gas oil which enters by means of line 17. The fat sponge oil, containing any absorbed gasoline hydrocarbons, leaves the bottom of the absorber tower by means of line 28 at a temperature of about 330° F. and is heated by means of indirect heat exchanger 29 before passing to the gasoline hydrocarbon stripper 30. In the stripper the fat sponge oil is further heated by indirect heating with a steam coil 31 to a temperature of about 350° F. in order to volatilize gasoline hydrocarbons which exit from the stripper by means of line 32. The lean sponge oil is recycled through pump 33 and line 17 to the gasoline hydrocarbon absorber tower 25.

Further purification of the gasoline hydrocarbons may be effected in purifier 34, wherein the hydrocarbons are heated by means of reboiler 36 and then passed through a cooling zone 37 wherein the hydrocarbons are condensed and exit by means of line 38 while any gases remaining in a vapor state pass by means of line 39 to the acid gas collecting line 24.

In accordance with this invention, the difference in temperature between the top and bottom sections of the absorber tower 11 should be in the order of 50° F.–150° F., the optimum figure depending essentially on the feed gas composition. The temperature at the point of reboiling (e.g. the bottom of the column) is normally in the order of 150° F.–250° F. The pressure in the absorber 11 is preferably between about 10 and 2,000 p.s.i.a., normally 10–1,000 p.s.i.a. Exit temperatures may be in the order of about 80° F.–175° F. In the acid gas stripper pressures may be in the preferred order of 2–100 p.s.i.a., preferably 2–50 p.s.i.a. The bottom of the stripper column 21 is usually heated to a temperature in the order of 300° F.–400° F. while acid gases exit from the top at a temperature of about 50° F.–150° F.

In one aspect of this invention the hydrogen sulfide extracted from the sour feed is to be utilized for the preparation of elemental sulfur. This may be done by the Claus sulfur process or may be effected by the process as shown in FIGURE II. The equipment described in connection with FIGURE II involve only the essential pieces of equipment, associated auxiliary units of equipment being eliminated for the sake of brevity and clarity.

According to FIGURE II, the sour gas feed from a source 40 is sent by means of line 41 to the high pressure absorber-reactor 42 under a pressure of 10–2,000 p.s.i.a. and at a temperature of 50° F.–150° F. Therein the feed is contacted with an amide such as dimethylformamide, entering the absorber 42 by means of line 43. The absorber 42 is a rectified column such as that described for absorber 11 in connection with FIGURE I. Sulfur dioxide is injected into the column by means of line 44 and reacts with hydrogen sulfide absorbed in the amide from the sour gas feed, thus forming elemental sulfur in the form of a heavy rapidly settling precipitate. The unabsorbed sweet gases pass to section 45 of the absorber column 42 wherein they are scrubbed with lean amide such as dimethylformamide from line 46. The purpose of this scrubbing is to remove any excess sulfur dioxide which may have remained in the unabsorbed stream as it passes from the reactor section 47 of the absorption column 42.

The amide containing suspended elemental sulfur is conducted by means of line 51 to the sulfur settler 52 wherein sulfur settles to the bottom and the amide, containing water of reaction, is heated sufficiently to volatilize water while the regenerated lean amide is recycled to the reactor 42 by means of line 43. The volatilized water leaves the settler column by means of line 53. This section may contain a sponge oil section, not shown.

Sulfur is removed from the bottom of the sulfur settler and sent to storage if desired. The sulfur dioxide added by means of line 44 to the reactor absorber 42 may come from an extraneous source or may be obtained by oxidation of part of the sulfur with oxygen by known means to form $SO_2$.

We claim as our invention:

1. In the process for the separation of hydrogen sulfide from its admixture with lower molecular weight hydrocarbons, said mixture containing at least .1 mol percent of hydrogen sulfide, wherein the admixture is intimately contacted at a pressure of 10–2,000 p.s.i.a. with a liquid dialkyl N-substituted aliphatic acid amide, whereby hydrogen sulfide and hydrocarbons are absorbed by the amide and thereby separated from the major portion of unabsorbed sweet hydrocarbon gases the improvement comprising effecting contact under a pressure in excess of 10 p.s.i.a. in a rectified absorption zone, the temperature differential between the top and the bottom of the zone being between about 50° F. and about 150° F., whereby the weight ratio of hydrocarbons to hydrogen sulfide in the amide is less than about 5:100.

2. A process according to claim 1 wherein the hydrocarbons absorbed by the amide are gasoline hydrocarbons and wherein the acid gases contaminated with said gasoline hydrocarbons are contacted with hydrocarbons boiling in the gas oil range whereby gasoline hydrocarbons are absorbed in the gas oil hydrocarbons while the acid gases are separated therefrom.

3. A process according to claim 2 wherein the amide is N,N-dimethylformamide.

4. A process for removing hydrogen sulfide from a gaseous mixture comprising normally gaseous hydrocarbons, gasoline hydrocarbons and at least 0.1 mol percent hydrogen sulfide comprising:

(1) countercurrently contacting the mixture with a liquid dialkyl N-substituted aliphatic acid amide under a pressure in excess of 10 p.s.i.a. in a rectified absorption zone, the difference in temperature between the top and bottom of the zone being between about 50° F. and about 150° F., whereby hydrogen sulfide and contaminating amounts of hydrocarbons are absorbed in the amide to form a fat amide solution and separated from non-absorbed sweet hydrocarbons, the weight ratio of absorbed contaminating hydrocarbons to hydrogen sulfide being less than about 2.5 to 1;

(2) contacting the acid gases, contaminated with gasoline hydrocarbons, with gas oil hydrocarbons, whereby gasoline hydrocarbons are absorbed to form a fat gas oil and separated from acid gases;

(3) heating the fat amide solution whereby hydrogen sulfide volatilizes therefrom and lean amide is formed;

(4) heating the fat gas oil whereby gasoline hydrocarbons volatize therefrom and lean gas oil is formed;

(5) recycling lean amide for further use in step (1); and (6) recycling lean gas oil for further use in step (2).

5. A process according to claim 4 wherein hydrogen sulfide obtained in step (3) is subjected to oxidation to form sulfur dioxide, combining the sulfur dioxide with further quantities of hydrogen sulfide from step (3), and catalytically reacting the mixture so formed to obtain elemental sulfur.

6. A process according to claim 1 wherein sulfur dioxide is introduced into the contacting zone whereby elemental sulfur is formed by reaction between hydrogen sulfide and sulfur dioxide.

7. The process which comprises:

(1) contacting a sour natural gas containing at least 0.1 mol percent hydrogen sulfide together with normally gaseous hydrocarbons under a pressure in excess of about 10 p.s.i.a. with a dialkyl N-substituted aliphatic acid amide in a rectified absorption zone, the temperature differential between the top and bottom of the zone being between about 50° F. and about 150° F. whereby hydrogen sulfide is absorbed and separated from rejected hydrocarbons;

(2) introducing sulfur dioxide into the absorption zone, whereby elemental sulfur is formed by reaction between sulfur dioxide and hydrogen sulfide;

(3) separating elemental sulfur from the amide;

(4) oxidizing sulfur so separated to form sulfur dioxide;

(5) injecting sulfur dioxide from step (4) for the absorption zone of step (2); and (6) recycling amide from step (3) to the absorption zone in step (1).

References Cited by the Examiner

UNITED STATES PATENTS

| | | | |
|---|---|---|---|
| 2,251,216 | 7/1941 | Woodhouse | 23—2.3 |
| 2,994,588 | 8/1961 | Eickmeyer | 23—226 |
| 3,023,088 | 2/1962 | Urban et al. | 23—226 |
| 3,161,461 | 12/1964 | Deal et al. | 23—225 |

OSCAR R. VERTIZ, *Primary Examiner.*

MAURICE A. BRINDISI, *Examiner.*

H. S. MILLER, A. J. GREIF, R. DAVIDSON,
*Assistant Examiners.*